United States Patent [19]

Dacier

[11] Patent Number: 4,517,484
[45] Date of Patent: May 14, 1985

[54] DOUBLE GAP ELECTRIC GENERATING MACHINES

[75] Inventor: Jacques Dacier, Mont-sur-Marchienne, Belgium

[73] Assignee: Ateliers de Constructions Electriques de Charleroi (ACEC), Brussels, Belgium

[21] Appl. No.: 467,186

[22] Filed: Feb. 16, 1983

[30] Foreign Application Priority Data

Feb. 18, 1982 [EP] European Pat. Off. ... EP82200189.7

[51] Int. Cl.³ .............................................. H02K 1/22
[52] U.S. Cl. .................................. 310/266; 310/156; 310/157
[58] Field of Search ................... 310/266, 157, 89, 91, 310/156, 67; 290/52

[56] References Cited

U.S. PATENT DOCUMENTS

| | | | |
|---|---|---|---|
| 2,928,963 | 3/1960 | Bertsche | 310/266 |
| 3,470,408 | 9/1969 | Lewis | 310/156 |
| 3,845,338 | 10/1974 | Fawzy | 310/266 |
| 4,087,713 | 5/1978 | Binder | 310/266 |

FOREIGN PATENT DOCUMENTS

| | | | |
|---|---|---|---|
| 1295066 | 5/1969 | Fed. Rep. of Germany | 310/266 |
| 2816672 | 10/1979 | Fed. Rep. of Germany | 310/266 |
| 0312273 | 11/1933 | Italy | 310/266 |
| 60918 | 5/1977 | Japan | 310/266 |
| 2358 | 1/1980 | Japan | 310/266 |
| 6403631 | 2/1965 | Netherlands | 310/266 |

*Primary Examiner*—R. Skudy
*Attorney, Agent, or Firm*—Schwartz, Jeffery, Schwaab, Mack, Blumenthal & Koch

[57] ABSTRACT

In these machines, the rim (16) of the rotor (13), supported overhangingly by oblique arms (15), is equipped with a double set of polar pieces (17 and 18), one fastened to the outer part of the rim (16) and called the peripheral polar pieces (17) and the other attached to the inner part of the rim (16) and called the internal polar pieces (18).

The peripheral polar pieces (17) define with a first stator (20) fastened to the external ferrule (10) of the machine, a first gap (19).

The internal polar pieces (18) define with a second stator (22) attached to an inner ferrule, a second gap (21).

The inner and peripheral polar pieces (17 and 18) are arranged back-to-back, in pairs of inverse polarity, to obtain a radial flux in the rim (16) and the polar pieces (17 and 18).

4 Claims, 2 Drawing Figures

DOUBLE GAP ELECTRIC GENERATING MACHINES

For several years an increasing interest has been manifested in research concerning the rational utilization of energy available by equiping low drops of rivers of the plains with hydroelectric power stations provided with groups of bulbs. These bulb groups were chosen because of their compactness resulting in important savings in civil engineering work, greater simplicity in construction and installation and in regular and continuous forms of the hydraulic conduits which contributes to an increase in the hydraulic performance of the turbine.

These bulb groups are characterized by the position of the alternator mounted in the flow itself, in a narrow chamber of water.

In most cases, the turbine wheel is acting directly on the alternator, the rotor of which is coupled with the shaft of the turbine by means of a crosspiece comprising a hollow hub or core and a plurality of radial arms supporting the rim to which the polar pieces are resting. Frequently the bulb ferrule serves as the casing of the stator of the alternator, the magnetic core of which is supported by several holding straps distributed regularly over the periphery of the casing.

In these embodiments, the maximum external diameter of the chamber is more or less the same as that of the moving wheel. This fact leads to a very low filling rate of the internal part of the bulb, as the active parts are located on the periphery and the center is occupied by the means joining the rim covered with poles and the shaft of the machine. The present invention is intended to remedy this poor utilization of the space available inside the bulb by equipping the machine with a second stator and providing the rotor with a second set of polar pieces.

The machine claimed according to the invention thus comprises a rotor equipped with a first set of polar pieces fastened to the periphery of the rim of the rotor and designated the peripheral polar pieces and a second set of polar pieces fastened to the internal part of the rim and designated the internal polar pieces.

The peripheral polar pieces are passing in front of a first stator called the peripheral stator, the casing of which is the ferrule of the bulb. The peripheral polar pieces are separated from the peripheral rotor by a first gap, called the peripheral gap.

The internal polar pieces pass in front of a second stator called the inner stator, the casing of which is supported by a solid crown braced against the ferrule of the bulb. The internal polar pieces are separated from the inner stator by a second gap called the inner gap.

By the creation in this manner of a second gap, the power of the machine is greatly increased for the same space occupied, or, with an equal power, the diameter of the bulb is substantially reduced. This latter possibility is of dual importance; it increases the number of groups located on the same dam, and it reduces the cost of civil engineering work by reducing the transverse size of the installation by virtue of the decrease in the length of the bulb, while maintaining the same constriction of the fluid flow.

In this novel embodiment, the rim, equipped with two sets of polar pieces: the peripheral polar pieces and the internal polar pieces, is supported overhangingly by means of oblique arms connected with the hub.

The invention will become more apparent from the figures hereinafter:

Figures 1, 2:
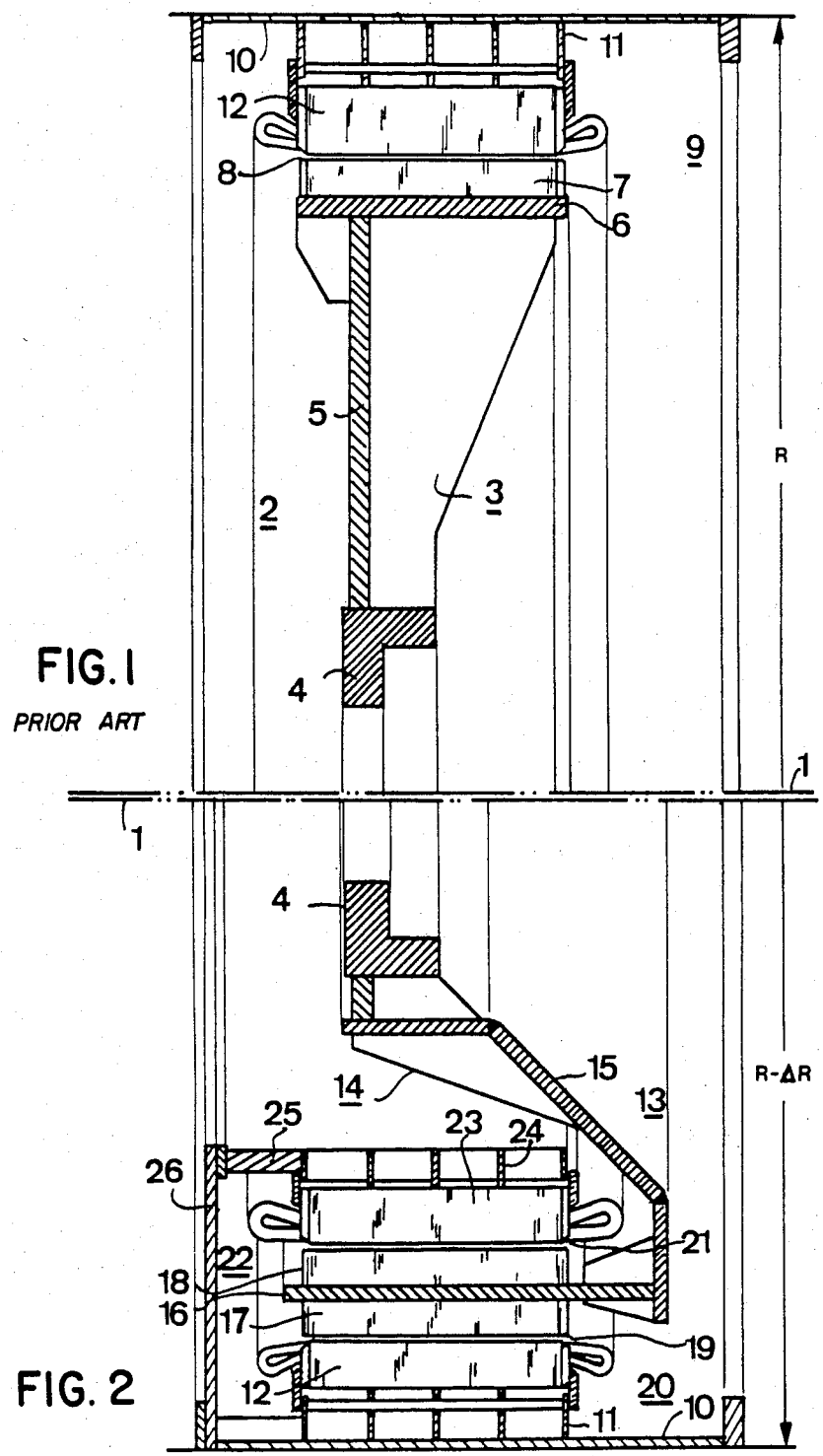
FIG. 1 is a cross section showing the conventional disposition of a bulb group alternator.
FIG. 2 is a cross section of an alternator of the same power constructed according to the invention claimed herein.

In FIG. 1, an axis 1 represents the axis of a turbine shaft joined to a rotor 2 of an alternator by means of a crosspiece 3 formed by a hollow hub 4 and radial arms 5 fastened to the hub 4. The radial arms 5 serve to support a rim 6 on which the polar pieces 7 are mounted. Separated by a gap 8, the rotor 2 rotates in a stator 9 consisting of a casing 10 holding a series of fastening straps 11 to support a magnetic hub 12.

In this embodiment, the casing 10 also serves as the ferrule of the bulb group.

FIG. 2 represents an embodiment of a double gap alternator.

In FIG. 2, the axle 1 of the turbine shaft is coupled with a rotor 13 consisting of a crosspiece 14 formed by a hollow hub 4 and a plurality of oblique arms 15 supporting, overhangingly, a rim 16 to the outer side whereof is fastened a plurality of first magnetic polar pieces designated the peripheral polar pieces 17 and to the inner side a plurality of second magnetic polar pieces, designated the inner polar pieces 18.

Separated by a peripheral gap 19, the peripheral polar pieces 17 pass in front of a first wound stator called the peripheral stator 20, the magnetic hub 12 whereof is supported against the ferrule 10 serving as the casing by means of the fastening straps 11.

Similarly, the inner polar pieces 18, separated by an inner gap 21, pass before a second stator designated the inner stator 22, comprising a magnetic core 23 mounted by means of fastening straps 24 on an inner casing 25, which in turn is connected with the ferrule 10 by means of a bracing crown 26.

The peripheral or first polar pieces 17 and the inner or second polar pieces 18 mounted in either side of the rim 16 are fastened to the latter in equal number, forming radial pairs, so that first and second polar pieces of opposing signs or polarities are placed back-to-back respectively in order to obtain a harmonious flow of the magnetic flux.

The magnetic hub 12 has a first diameter; core 23 has a second diameter, less than the first diameter; and annular rim 16 has a third diameter, less than the first diameter and greater than the second diameter.

In this double gap machine, the flux is thus radial in its inner polar pieces 18, in the rim 16 and in the peripheral polar pieces 17 and tangential in the magnetic hub 12 and core 23. An embodiment leading to a particularly economical application of this configuration is relative to a bulb group alternator as it results in a reduction of the diameter of the bulb group.

This new configuration may further be applied to vertical axis Kaplan turbines, the rotating velocity of which is not very high. In this case, the axle of the alternator is also vertical and the inner stator 22 is installed on site after the mounting of the turbine wheel by passing it through the peripheral stator 20.

This machine with its double stators has the advantage of being capable of continued operation in case of damage to the winding of one of the two stators.

The configuration that is the object of the present invention obviously is also applicable to a reversible group, such as an alternator combined with a tubine pump.

I claim:

1. An electric generating machine having an outer casing, an inner casing, and a shaft, comprising:
   a first stator comprising a first annular wound magnetic hub having a first diameter, said first stator being mounted within the outer casing;
   a second stator comprising an annular wound magnetic core having a second diameter less than the first diameter mounted about the inner casing so that the second stator is disposed within and concentric with the first stator; and
   a rotor comprising:
      an annular rim having a third diameter less than the first diameter and greater than the second diameter joined to the shaft, the rim having an inner face and outer face;
      a plurality of first polar pieces disposed on the outer face of said rim so as to form a first annular gap between the plurality of said first polar pieces and the first stator; and
      a plurality of second polar pieces disposed on the inner face of said rim so as to form a second annular gap between the plurality of said second polar pieces and the second stator, the second annular gap being concentric with the first annular gap.

2. An electric generating machine as claimed in claim 1, wherein the inner casing is connected to the outer casing by means of a bracing crown.

3. An electric generating machine as claimed in claim 1, wherein the number of the first polar pieces equals the number of the second polar pieces and wherein said first and second polar pieces are attached to the outer face and the inner face, respectively, in radial pairs, oriented with opposing magnetic polarities facing each other.

4. An electric generating machine as claimed in claim 2, wherein the number of the first polar pieces equals the number of the second polar pieces and wherein said first and second polar pieces are attached to the outer face and the inner face, respectively, in radial pairs, oriented with opposing magnetic polarities facing each other.

* * * * *